K. E. STUART.
VEHICLE BUFFER.
APPLICATION FILED APR. 29, 1912.
1,059,646.
Patented Apr. 22, 1913.
2 SHEETS—SHEET 1.
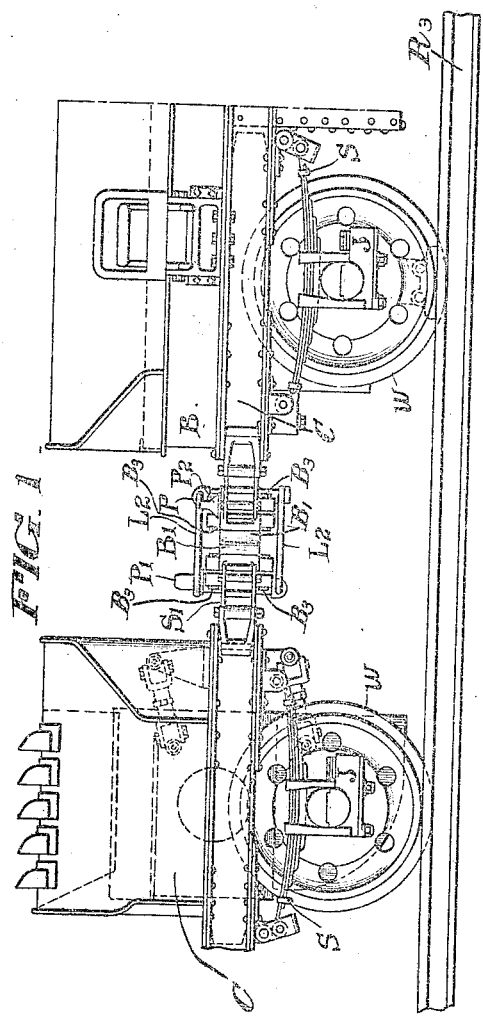
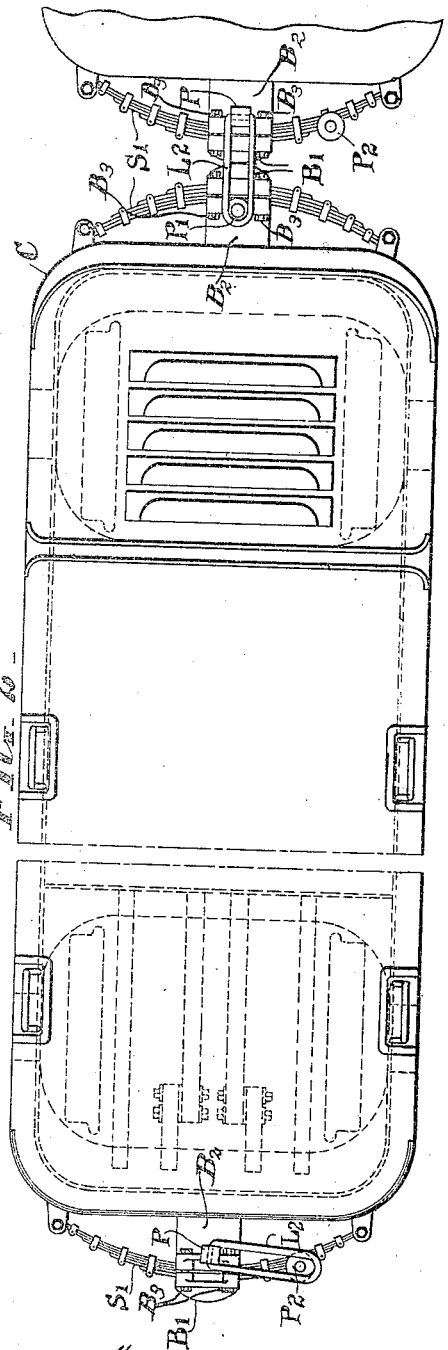
WITNESSES
Daniel Webster Jr.
Beatrice Whitney
INVENTOR
Kenneth E. Stuart
BY Cornelius D. Ehret
ATTORNEY K. E. STUART.
VEHICLE BUFFER.
APPLICATION FILED APR. 29, 1912.
1,059,646.
Patented Apr. 22, 1913.
2 SHEETS—SHEET 2.
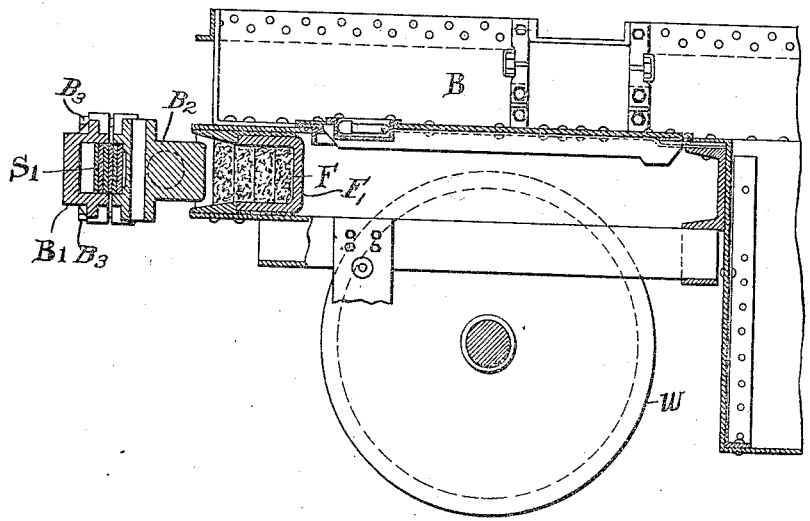
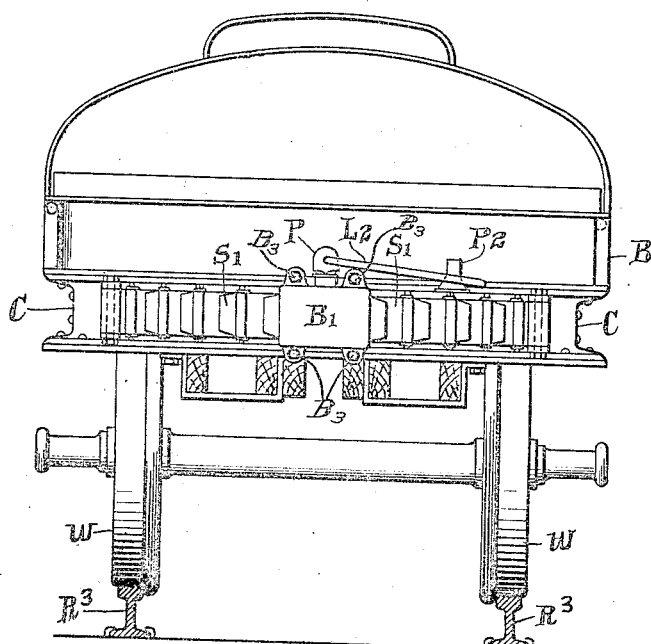
WITNESSES
INVENTOR
Kenneth E. Stuart
BY
Cornelius L. Ebet
his ATTORNEY

UNITED STATES PATENT OFFICE.

KENNETH E. STUART, OF PHILADELPHIA, PENNSYLVANIA.

VEHICLE-BUFFER.

1,059,646.  Specification of Letters Patent.  Patented Apr. 22, 1913.

Original application filed September 9, 1910, Serial No. 581,208. Divided and this application filed April 29, 1912. Serial No. 693,974.

*To all whom it may concern:*

Be it known that I, KENNETH E. STUART, a citizen of the United States, residing in the city of Philadelphia, county of Philadelphia, and State of Pennsylvania, have invented a new and useful Vehicle-Buffer, of which the following is a specification.

My invention relates to buffers for railway vehicles for absorbing shocks between cars or vehicles of a train, and for like purposes.

For an illustration of one of the forms my invention may take, reference is to be had to the accompanying drawings, in which:

Figure 1 is a side elevational view of a car or vehicle having my improved buffer thereon. Fig. 2 is a top plan view of the same. Fig. 3 is a side elevational view of part of a car with the buffer construction shown in longitudinal section. Fig. 4 is a side elevational view of one end of a vehicle, the buffer being shown in section.

Upon the running rails $R^3$, $R^3$ roll the wheels $w$ of the car or vehicle, these wheels having journals $J$ between which and the vehicle or car frame $C$, here shown as a rolled channel section, intervene the springs $S$. The body of the car $B$ is carried by the car frame $C$.

A leaf spring $S^1$ extends across the end of the frame $C$ and is supported thereon at its ends. Upon the spring $S^1$, substantially in the axis of the car, is a buffer comprising the parts $B^1$ and $B^2$, the former disposed in front of and the latter back of the spring $S^1$, the parts $B^1$ and $B^2$ being secured together by bolts $B^3$.

The members $B^1$ carry coupling pins $P$ and $P^1$ and a link $L^2$ for coupling two cars together. In Fig. 2 the link at the front (left) end of the car is thrown over a pin $P^2$, carried by a spring $S^1$, to prevent the link from swinging about. At the rear end the car is shown coupled to another car.

The buffer member $B^2$ has an inwardly extending portion adapted to enter a recess in the car frame $C$. And with this aperture or recess in the car frame $C$ registers the opening in the hollow member $F^1$. Within the pocket so formed are disposed blocks $F$ of felt, or any other suitable shock absorbing material.

The leaf springs $S^1$ carrying the buffers are intended to absorb the shocks of jolting between cars in ordinary running, while the felt blocks are intended to absorb the more severe shocks of collision, as where two cars are brought together in coupling, the two forming a very simple and efficient buffer capable of absorbing the maximum amount of energy that a car can have under conditions of traffic.

This application is a division from my application Serial No. 581208, filed September 9, 1910.

What I claim is:—

1. The combination with a car frame, of a spring extending across the end of said frame and spaced therefrom, means securing said spring to said frame at the sides of said frame, a member having a pocket carried by said frame, shock absorbing material in said pocket, and a buffer block carried by said spring adapted to impinge upon said shock absorbing material.

2. The combination with a car frame, of a spring supported at its ends upon the end of said frame and extending across the same and spaced therefrom, a buffer block carried by said spring, a member having a pocket rigidly secured to said frame, shock absorbing material in said pocket, and an extension on said buffer block adapted to impinge upon said shock absorbing material.

3. The combination with a car frame, of a spring extending across said frame and supported at its ends at the sides of said frame, a member having a pocket, shock absorbing material in said pocket, said frame having an aperture registering with said pocket, and a buffer block carried by said spring and adapted to impinge upon said shock absorbing material.

4. The combination with a car frame, of a spring carried by said frame and extending across the end thereof, a member having a pocket carried by said frame, shock absorbing material in said pocket, a divided buffer embracing said spring and having an extension adapted to impinge upon said shock absorbing material.

5. The combination with a car frame, of a spring extending across the end thereof and supported thereby, a member having a pocket, shock absorbing material in said pocket, a buffer block carried by said spring and adapted to engage said shock absorbing material, and car coupling means engaging said buffer block.

In testimony whereof I have hereunto affixed my signature in the presence of the two subscribing witnesses.

KENNETH E. STUART.

Witnesses:
   JAMES WHITING,
   C. O. LATIZ.